Aug. 21, 1956   C. L. SINGLETON   2,760,183
VERIFYING MACHINE

Filed April 26, 1950   6 Sheets-Sheet 1

*INVENTOR.*
CLIFFORD LEE SINGLETON
BY

ATTORNEY

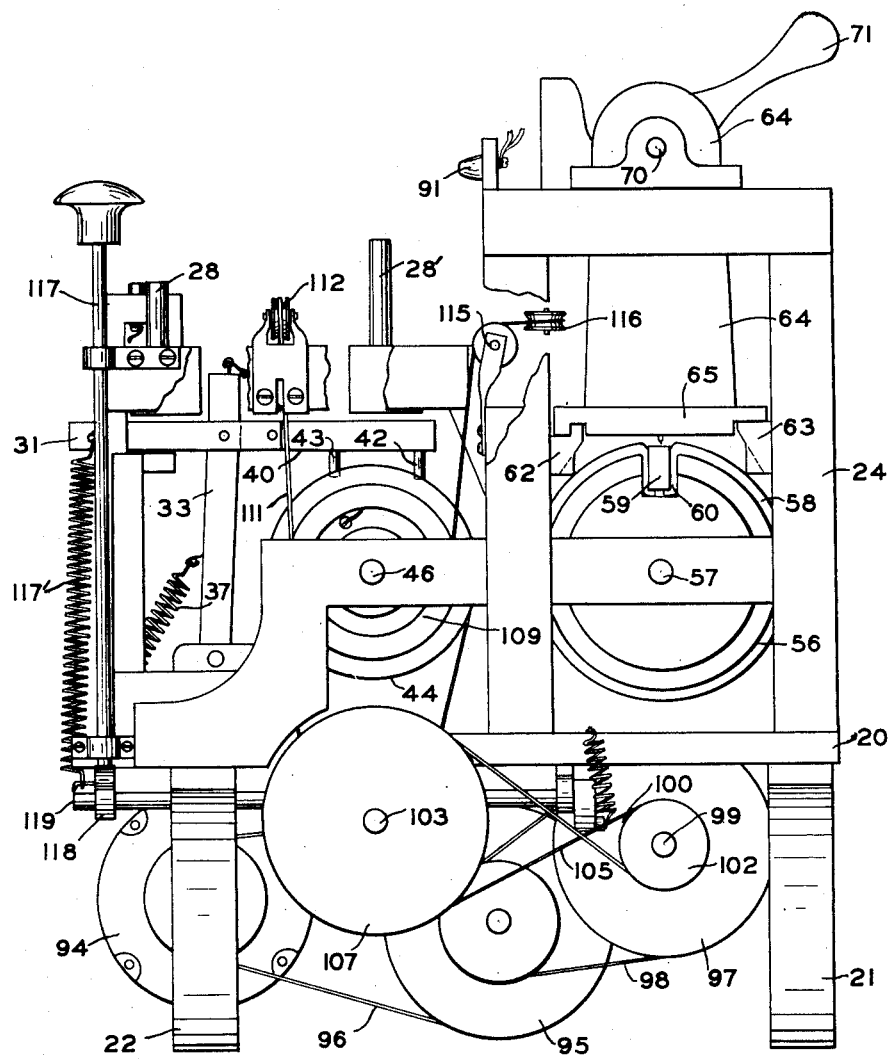
FIG 2
INVENTOR.
CLIFFORD LEE SINGLETON
BY 
ATTORNEY

Aug. 21, 1956  C. L. SINGLETON  2,760,183
VERIFYING MACHINE
Filed April 26, 1950  6 Sheets-Sheet 3

INVENTOR.
CLIFFORD LEE SINGLETON
BY
ATTORNEY

Aug. 21, 1956 C. L. SINGLETON 2,760,183
VERIFYING MACHINE

Filed April 26, 1950 6 Sheets-Sheet 4

INVENTOR.
CLIFFORD LEE SINGLETON
BY
ATTORNEY

Aug. 21, 1956     C. L. SINGLETON     2,760,183
VERIFYING MACHINE
Filed April 26, 1950                                                      6 Sheets-Sheet 5
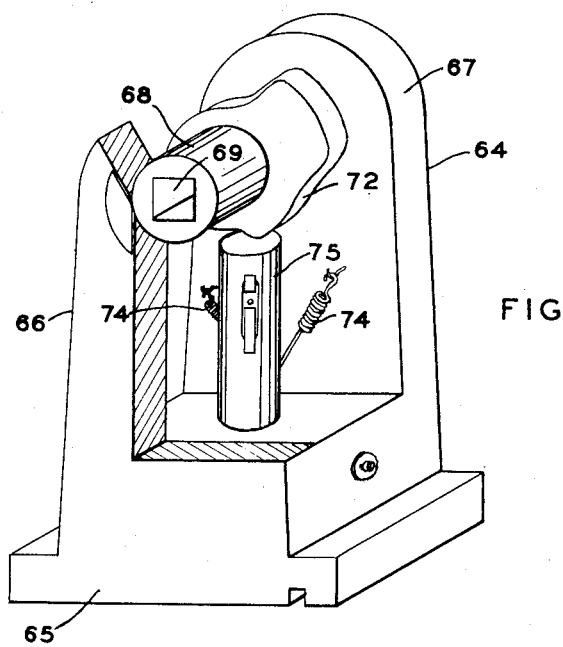
FIG 5
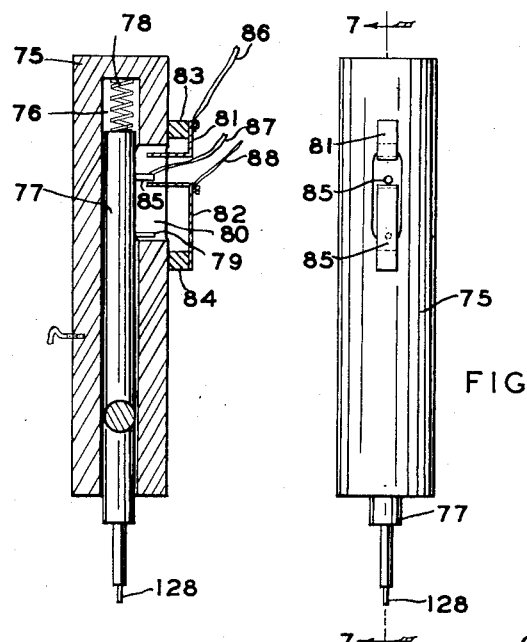
FIG 6
FIG 7
*INVENTOR.*
CLIFFORD LEE SINGLETON
BY
ATTORNEY Aug. 21, 1956 C. L. SINGLETON 2,760,183
VERIFYING MACHINE
Filed April 26, 1950 6 Sheets-Sheet 6

INVENTOR.
CLIFFORD LEE SINGLETON
BY
ATTORNEY

United States Patent Office 2,760,183
Patented Aug. 21, 1956

2,760,183

VERIFYING MACHINE

Clifford Lee Singleton, Atlanta, Ga., assignor to General Developers Company, Atlanta, Ga., a partnership Application April 26, 1950, Serial No. 158,312

11 Claims. (Cl. 340—149)

This invention relates to a verifying machine and more particularly to a machine which checks a combination of characters, either numbers or letters or both, against a master tabulation thereby identifying the pre-set status of the particular combination of characters.

The invention disclosed and claimed in the present application has a particular use in hotels, department stores, and other institutions which are continuously extending services, such as cashing checks, to the holders of their credit cards. In providing credit services to large numbers of individuals, the various establishments usually issue numbered credit cards which are a means of immediate identification; however, these credit cards, for practical purposes, are only issued once a year or longer, and are not changed during the life span of the card; but the financial condition of the card holder may change to the point after which it is unwise to extend further credit.

Ordinarily the only system available to the many branch offices of hotel chains and the like for checking credit status is a manual system of indexed file cards which, in view of the tremendous clientele, takes considerable space, and in like manner considerable time is expended in searching through the cards in order to identify the credit of a particular individual who has presented himself at the service desk and requested credit. Ofttimes this obvious checking of credit is insulting to patrons, particularly those of high financial standing and unquestionable reputation; and, in addition, the delay caused the patron while the credit check is being made is extremely annoying.

The present machine may be installed at the service desk of the particular establishment to replace all other records and files pertaining to the credit of the patrons. When a credit card having an identifying character is presented in conjunction with a request for credit, the employee on duty enters the identifying character in the machine and thereafter receives an indication from the machine as to whether or not the credit of the patron is still good. When it is necessary to nullify the credit of a particular patron, usually after information is received from a credit bureau, the identifying character is entered in the machine, the machine is operated to the position of the particular character, and finally an adjustment is made in the master tabulation to nullify credit. From that time on, the credit of that particular identifying character shows on the machine as bad.

My invention provides a compact, dependable machine which includes one element of the tabulation of the credit status of each individual, identifiable by numbers or letters or both, another element of the keyboard type or the like into which the particular identification character of the individual may be entered at any time, and an element of conveying to the operator the finding of the machine for the particular group of characters. The operation from start to finish is quick and effective and it is not necessary for the operator to communicate verbally with the patron regarding the credit check.

It is, therefore, an object of this invention to provide an automatic machine for the immediate verification of a particular group of characters.

A further object of this invention resides in the particular construction whereby the resultant findings of the machine are readily apparent to the operator.

Another object of my invention is to provide a verifying machine in which changes in the status of the character groups may be readily entered in the machine.

Also an object of my invention resides in the particular construction wherein an extremely large number of character combinations is available, each of the character combinations being independent of all others.

Another object of my invention is to provide a master tabulation which contains the particular status of each of the combinations of characters.

A further object of this invention is to provide a verifying machine which may be completely operated and controlled from one central location by only one individual.

An additional object of this invention is to provide a verifying machine which is simple to operate and requires no specialized training course or instructions for an understanding of its operation.

Another object of this invention is to provide a verifying machine which is rugged in construction and extremely accurate in operation over a long period of continuous operation.

A further object of this invention is to provide a verifying machine which may be operated from the ordinary A. C. 110 volt, 60 cycle lines common to most buildings and offices.

Other and further objects and advantages of my invention will be apparent from the following description taken in conjunction with the accompanying drawings in which like characters of reference designate corresponding parts throughout the several views, and wherein:

Fig. 2 is a right side elevation of the embodiment of Fig. 1.

Fig. 5 is a perspective view, on an enlarged scale, of a detail of my invention with parts broken away.

Fig. 6 is a side view of a detail, on an enlarged scale.

Fig. 7 is a cross-sectional view taken on the line 7—7 of Fig. 6.

Figure 1:
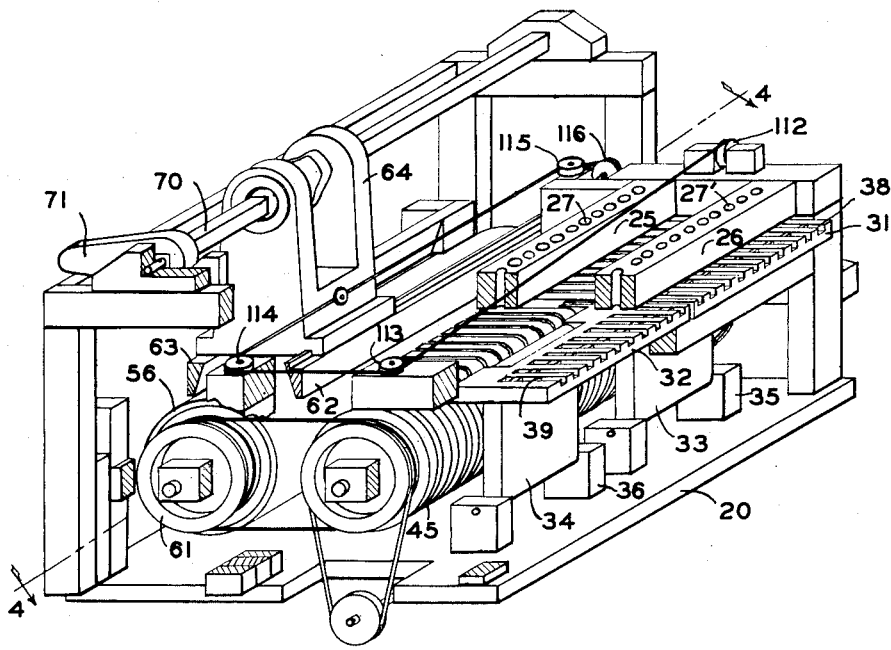
Fig. 1 is a perspective view, with parts broken away, of a particular embodiment of my invention.
Figure 3:
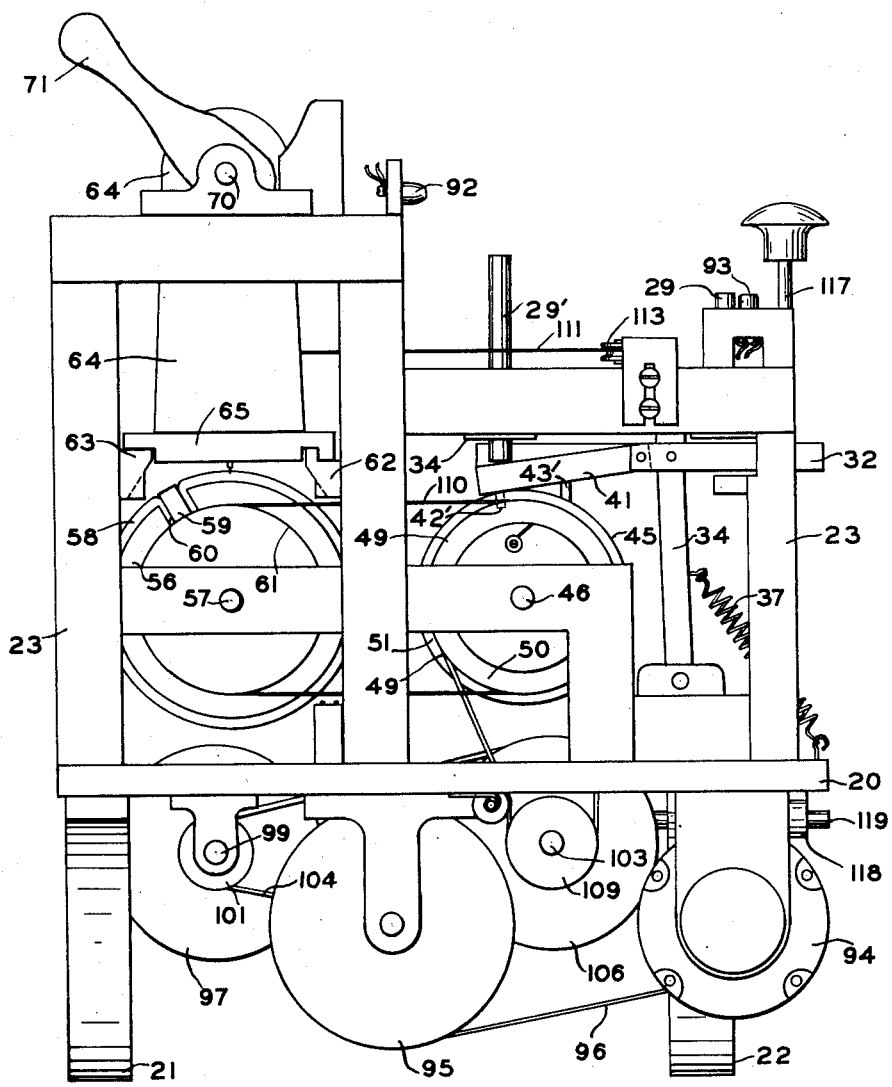
Fig. 3 is a left side elevation of the embodiment of Fig. 1.

In the drawings, more particularly in Figs. 1, 2 and 3, the device is shown as having a substantially rectangular base support plate 20 resting on two feet 21 and 22. These feet 21 and 22 shown in Figs. 2 and 33 are adapted to support the entire machine upon a stand or table and are of a height sufficient to permit certain of the mechanisms of the machine to be mounted or swung below the main base plate 20.

Mounted on the rectangular base plate at each end thereof, are more or less identical frame works designated generally on the drawings by the numerals 23 and 24 in Figs. 2 and 3 and consisting of suitable uprights and cross braces for supporting the several shafts and other mechanisms as will be described later in this application.

Rigidly supported between upper cross members of the end frames 23 and 24 are, as best seen in Fig. 1 two selector bars 25 and 26, each selector bar being provided with twenty aligned holes 27 and 27'. In reality, the twenty holes in each selector bar are divided into two groups of ten each which makes four groups of possible, selected combinations of numbers or characters for identification purposes. Each of the hole groups on the front selector bar 26 is adapted to be used with that group immediately behind it on the rear selector bar 25. In the present embodiment, with the holes 27 and 27' in the selector bars arranged into groups as described, it is possible to set up character groups composed of numbers from 0 to 9999.

Figure 4:
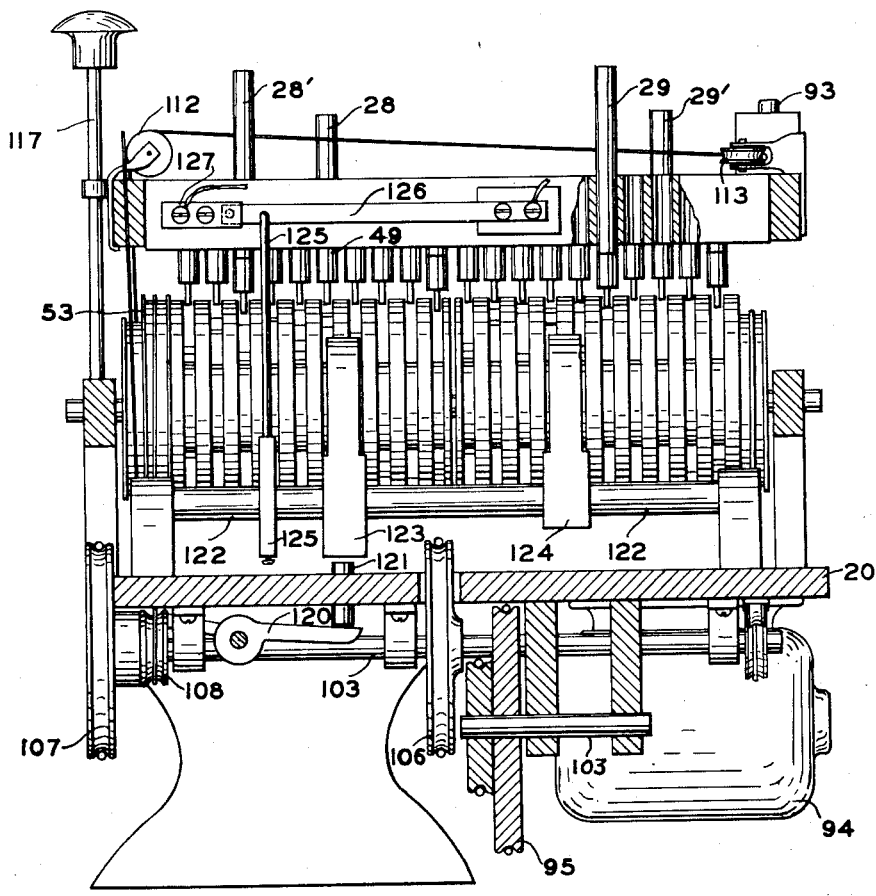
Fig. 4 is a cross-sectional view taken on the line 4—4 of Fig. 1.
Figure 8:
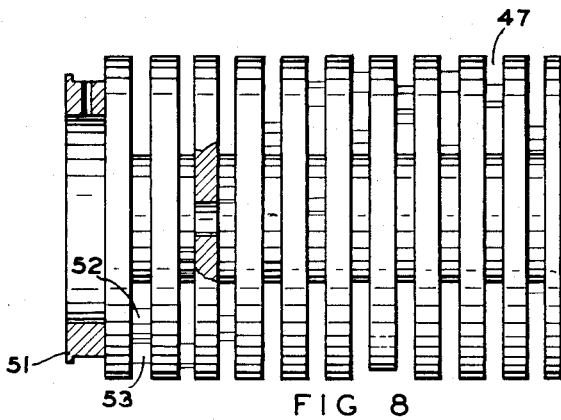
Fig. 8 is a front view of a detail.
Figure 9:
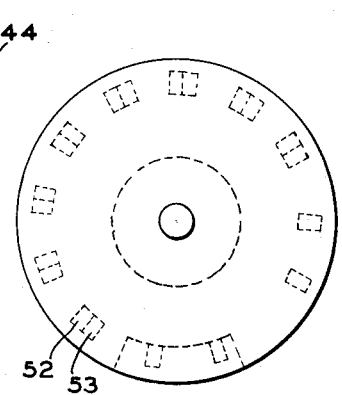
Fig. 9 is a side view of the detail of Fig. 8.
Figure 10:
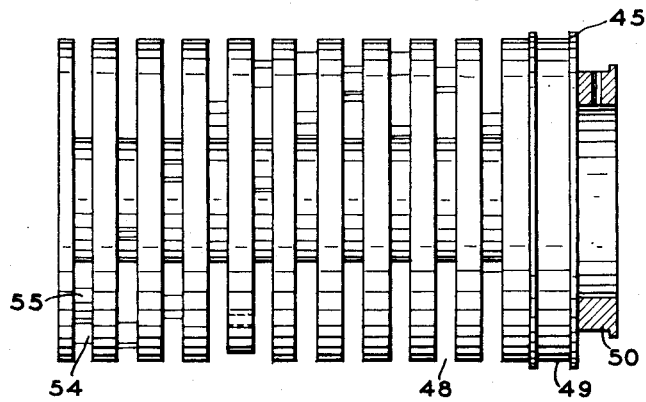
Fig. 10 is a front view of a detail.
Figure 11:
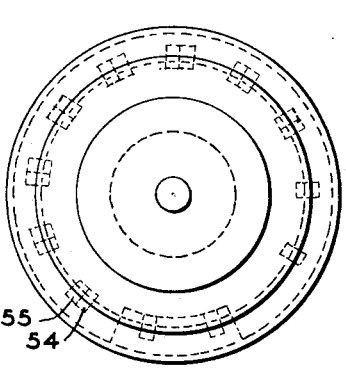
Fig. 11 is a side view of the detail of Fig. 10.

Adapted to be removably positioned in the holes of the selector bars are, as best seen in Fig. 4, selector pegs 28, 28', 29 and 29', one peg being for use as a selector in each of the hole groups. Each of the pegs is arranged to serve as a stop for other sliding and rotating mechanisms subsequently to be described.

Figure 13:
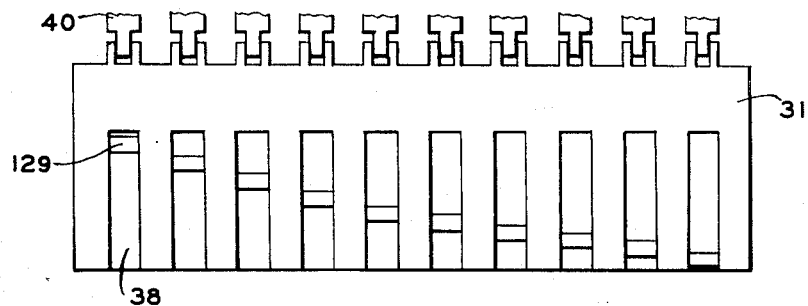
Fig. 13 is a top plan view of a detail, on an enlarged scale.

As seen in Fig. 1, I have provided a pair of stop plates 31 and 32 which are slidably mounted immediately beneath the forward selector bar 26. Each of these slidable stop plates is hinged to its own rocker arm 33 and 34, the rocker arms being, in turn, pivoted upon suitable feet 35 and 36. Each of the plates 31 and 32 are held in a retracted, neutral position by means of a tension spring 37. Each of the stop plates 31 and 32 is arranged to act independently of the other in its sliding movement beneath the front selector bar 26. Into the upper face of each of the stop plates 31 and 32 are milled slots 38 and 39 which are placed in alignment beneath their respective hole groups in the front selector bar 26. These slots are arranged to slidably receive the lower stud end of the selector pegs 28 and 29. In the present construction, each slot is of the same length but is provided with staggered stops 129 arranged so that when the peg 28 is moved across the holes successively in the selector bar 26, the stop plate corresponding to that particular group may be pushed under the selector bar increasing increments of depth, the shortest slot in this instance being on the left side of each selector bar and the longest on the right. This construction may be more clearly seen in Fig. 13 which shows a plan view of the slot arrangement on one of the stop plates.

On the inner end of each of the stop plates 31 and 32 is a series of ten fingers 40 in Fig. 2 and 41, in Fig. 3, each finger being pivoted separately to its stop plate in a manner to be independently operable by the selector peg 29' or 28' inserted into the holes of the rear selector bar 25. Each of these fingers is held in a neutral, horizontal plane by means of individual tension or leaf springs (not shown). Each of the fingers is provided with initial and final stop pins 42, 42', and 43, 43', respectively.

A pair of stop drums 44 and 45 are rotatably mounted on a common shaft 46 which is journaled in the end frames 23 and 24 as seen in Figs. 2, 3 and 4. As best seen in Fig. 8 through 11, each of the drums 44 and 45, in the present instance, consists of a unitary cylinder having a series of ten spaced notches 47 and 48 cut into the face of the same. Drum 45 is provided with two pulleys 49 and 50 integrally formed on one end while drum 44 has a single pulley 51 also integrally formed on one end. The present construction of the drums 44 and 45 could also be accomplished by mounting a series of disks on a common core. The width of the notches 47 and 48 which are turned into the drums is slightly greater than the diameter of the lower stud portion of the pegs 28' and 29'. In these prepared slots 47 and 48 are pairs of stops 52 and 53 on drum 44, and on drum 45 the pairs of stops in each slot 48 are designated by numerals 54 and 55. The pairs of stops are placed in staggered relationship so as to wind spirally around the drums from one end to the other and the individual stops of each pair are spaced apart in its slot for a distance approximating the initial and final stop pins 42 and 43 of the fingers 40 and 41.

As before mentioned the drums are rotatably mounted on a common shaft 46 and spaced transversely so that the slots on the drums will be in vertical alignment with its respective hole group in the gear selector bar 25. Both drums 44 and 45 are free to rotate upon the shaft 46 in such a manner that if one drum is held from rotation by a stop peg the other drum is free to turn with the shaft until its stop peg is finally engaged.

As shown in Figs. 1, 2 and 3, a large master tabulator drum or verifying cylinder 56 is fixed to a shaft 57 journaled in the end frames 23 and 24. The verifying cylinder 56 is located behind the two stop drums 44 and 45 and is substantially co-extensive with the width of the base plate 20. A sheet of thick material 58 incompasses the periphery of the cylinder 56 and is retained in place by a wedge bar 59 which locks the terminal edges of the material 58 in a groove 60 formed in the periphery of the cylinder 56. The cylinder is provide with a pulley 61 affixed to one end.

Affixed to the end frames 23 and 24 in a manner to be supported immediately above the verifying cylinder 56 is a track best seen in Fig. 1 consisting of two parallel runners 62 and 63. Mounted upon these runners 62 and 63 is an indicator carriage 64 constructed in accordance with Fig. 5 of the drawing. In this figure the carriage is shown as having a base 65 arranged to slide upon the runners 62 and 63 and is provided with upwardly extended arms 66 and 67. The upper ends of the arms are provided with a transverse bore parallel to the plane of the base 65 and adapted to receive a sleeve 68 between the arms 66 and 67. The sleeve 68 is provided with a square hole 69 through which a square bar 70 is extended, the ends of the bar being rotatably journaled in the end frames 23 and 24. One end of the bar 70 is provided with a manually controlled handle 71 by which the sleeve 68 may be turned while at any position during its sliding movement along the runners 62 and 63. The sleeve 68 is provided with a two-step cam 72 firmly affixed to the same which is, of course, directly operable by the handle 71 of the square bar 70.

Suspended upon a series of tension springs 74 is an indicator housing 75 which is placed so as to be in an operatively engaging position with the cam 72 when the same is turned by means of the square bar 70 and handle 71. The lower end of the housing 75 is extended through a hole provided substantially in the center of the base 65 so that the same might be urged downwardly according to the steps on the cam 72 and returned to a neutral position by means of the tension spring 74 when the cam is released.

Figure 12:
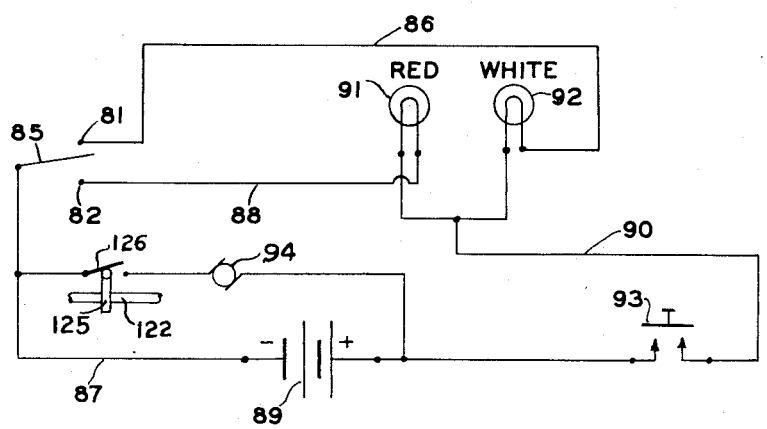
Fig. 12 is a wiring diagram of the motor circuit and the indicator light circuit.

As seen in Figs. 6 and 7, the indicator housing 75 is provided with a blind bore 76 into which an indicator plunger 77 is inserted. A compression spring 78 is placed in the bottom of the bore 76 and normally urges the plunger 77 downwardly, the travel being held in check by a stop pin 79 positioned in the side of the plunger 77. The housing 75 is provided with an opening 80 communicating with the inner bore 76 and defining a space for the electrical contacts. Two of these contacts 81 and 82 are affixed to insulating strips 83 and 84 mounted on the side of the housing 75 and are bent inwardly in the manner shown in Fig. 7. Another contact 85 is mounted directly to the plunger 77 between the bent contact strips 81 and 82. Leading from these contacts 81, 85, and 82 are wires 86, 87 and 88, respectively, which form part of the circuit diagram as shown in Fig. 12 of the drawing. In this figure it can be seen that the movable contact 85 is connected by wire 87 to one side of a suitable power source, such as storage battery 89, the other side of the battery having a wire 90 common to one side of a pair of indicator lights 91 and 92. The wires 86 and 88, leading from the other contacts 81 and 82 are connected to the opposite sides of the indicator lights 91 and 92. Positioned in the line wire 90 is a manually operated control switch 93.

Now it can be seen that when the cam 72 is actuated, the cylinder housing 75 is moved downwardly to make electrical contacts, the movements and purpose of which will be described later in the specification.

As shown in Figs. 2, 3 and 4, an electric motor 94 is secured beneath the base plate 20 and adapted to drive a transfer pulley 95 by means of a belt 96. This transfer pulley 95, in turn, drives another pulley 97 through its driving belt 98. This second pulley 97 is rotatably mounted on a control shaft 99 provided with a forward and reverse clutch mechanism 100. The control shaft 99 is provided with two spaced pulleys 101 and 102 which selectively drive a shaft 103 through either forward belt 104 or reversing belt 105, and pulleys 106 and 107, respectively. The shaft 103 is in alignment beneath the shaft 46 and carries an end pulley 108 which drives the pulley 50 on the stop drum 45, and on the other end a pulley 49 directly drives the pulley 61 on the verifying cylinder 56 by means of a belt 110. The pulley 109 is provided with an endless belt 111 which runs through transfer pulleys 112, 113 and 114 to the indicator carriage; from thence through other transfer pulleys 115 and 116 back around the pulley 109, so that, as belt 111 is driven by pulley 109, the carriage 64 is moved to the right or left across the machine.

In Figs. 2, 3 and 4, the control for the motor 94, which sets the machine in motion, consists in a push rod 117, the lower end of which abuts a cam 118 positioned on a cam shaft 119 having its opposite end operably connected to the clutch 100. Intermediate the ends of cam shaft 119 is another cam 120 abutting a push rod 121 movably positioned on the base plate 20. Positioned on the base member 20 between the two stop drums 44 and 45 is a combination clutch and motor control shaft 122 carrying a pair of clutch fingers 123 and 124 which respectively cooperate with notches cut into the periphery of each of the drums 44 and 45. One of the clutch fingers 123, 124 is positioned to be engaged by the push rod 121 in its upward movement so as to impart a partial rotation to the shaft 122 and thereby release both of the clutch fingers 123 and 124 from the notches cut into the drums.

As shown in Fig. 4, the motor control shaft 122 further carries a switch control arm 125 which presses against a spring steel circuit bar 126 rigidly attached to the frame, normally preventing the circuit bar 126 from completing a circuit through contact point 127. Referring to the circuit diagram in Fig. 12, it is readily seen that the motor circuit remains normally open and the motor de-energized until the push rod 121 is raised to rotate the shaft 122 to pull the arm 125 away from the circuit bar 126 causing the circuit bar 126 to come into contact with the contact point 127 and thus complete the circuit to the motor.

The clutch fingers 123 and 124 catch the notches in the drums 44 and 45 so as to hold the machine in its initial position prior to the setting up of the character group for verification. Movement of the main push rod 117 both actuates the clutch 100 and closes the motor circuit while simultaneously disengaging the clutch fingers 123 and 124 so that the drums 44 and 45 are free to rotate. The right hand drum 44 controls the movement of the indicator carriage 64 in its longitudinal movement above the verifying cylinder 56 and the left hand drum 45 controls the amount of rotational movement imparted to the verifying cylinder 56.

It can now be seen that the above described arrangement provides two simultaneous stages in the reaching of certain pin-point positions by the indicator plunger 77. When the verifying cylinder 56 is rotated an interval and the indicator carriage is simultaneously moved an interval across the cylinder, it is readily apparent that these innumerable pin-point positions may be easily and quickly reached at any time by placing the selector pegs in the proper positions in the selector bar.

As before mentioned, the keyboard is arranged to set up character groups composed of numbers from 0 to 9,999 and each particular group of numbers represents a definite pin-point location on the master tabulator 56, which location is reached any time that that particular number group is entered on the keyboard. The peg 29 in cooperation with the stop plate 32 controls the units, that is from 0 to 10; and the peg 29' in cooperation with the fingers 41 controls the tens, that is from ten to one-hundred. These two pegs of keys 29 and 29' control the extent of movement of the drum 45 and therefore the extent of movement of the indicator carriage 64.

The peg 28 in cooperation with the stop plate 31 controls the hundreds, that is from one-hundred to one-thousand; and the peg 28' in cooperation with the finger 40 controls the thousands, that is from one-thousand to ten-thousand. These two groups of pegs control the extent the movement of the drum 45 and therefore the extent of rotational movement of the master tabulator 56. When a particular group of numbers is entered in the machine the carriage 65 will move to a certain position while simultaneously the master tabulator drum 56 will rotate beneath the carriage 65 a certain arcuate distance, and when the motion is completed, the plunger 77, and therefore particularly the verifying point 128, is positioned directly over a particular spot on the master tabulator drum 56.

Referring again to Figs. 5, 6 and 7 in the drawings, it will be noted that the first movement or step on the cam 72 is used to verify any number as selected on the keyboard. The final maximum movement is used only to nullify a given position on the verifying cylinder 56, this procedure being fully described later in this specification.

Upon movement of the cam 72 into its first or verifying position, the indicator housing 75 is pushed downwardly for a distance sufficient to cause the verifying point 128 of the plunger 77 to be urged against the surface material 58 wrapped around the verifying cylinder 56. Compression in the upper compression spring 76 is not enough, however, to cause the verifying point 128 to make a perforation into the material on the verifying cylinder 56. In this downward movement of the housing 75, as soon as the verifying point 128 touches the surface of the cylinder 56, the housing 75 will continue to move around the plunger 77 to such an extent that electrical contact point 85 will finally touch contact point 81. Referring now to Fig. 12 it can be seen that by actuating the control switch 93, the battery 89 will illuminate the white light 92 to show that the status of a creditor whose credit number has been put into the machine is good.

Let us assume now, that the machine is used to verify a code number of a customer whose credit has been nullified by making a perforation into the surface material 58 of the verifying cylinder 56 at his particular code position.

When the machine is operated in the above described manner to move the verifying point 128 in Figs. 6 and 7 to the customer's code position on the verifying cylinder 56, the cam 72 is actuated for verification. The point 128, however, instead of being resisted by the surface material 58 simply drops into the previously perforated hole, thus leaving the two electrical points 82 and 85 in contact with each other. A reference again to Fig. 12 will show that when these two contacts are engaged, actuation of the switch 93 will illuminate the red light 91 to show that the customer's credit has been nullified and is not good.

In the operation of the instant embodiment, each character group represented by a number, represents a definite location on the master tabulator or verifying drum 56. Each of these numbers or locations would be assigned to a particular individual. Choosing, for example, the number 1234, selector peg 29 is inserted into the first hole in the front selector bar 26 at the left of the machine as a selection of the "thousands" or fourth integer in the number. In the second hole of the rear selector bar 25, just behind the first bar, a selector peg 29' is inserted into the second hole of the 27 group to represent the "hundreds." The insertion of the second peg 29' depresses one of the fingers 41 on the left stop plate 32 to limit the rotation of the drum 45 with which it is associated. Still another peg 28 is inserted into the number three hole in the front selector bar 26 to limit the sliding movement of the right hand stop plate 31. The final selector peg 28' is inserted into the fourth hole of the rear selector bar 25 to represent the final digit of the number. The machine is now set for operation.

The push rod 117 is depressed against the action of spring 117' thereby engaging the clutch 100 for forward motion and at the same time moves the auxiliary push rod 121 for disengagement of the clutch fingers 123 and 124 from the drums 44 and 45 and permitting the contact bar 126 to touch the contact 127 and thus close the electrical circuit to the motor.

As the motor 94 begins to revolve, the drums 44 and 45 begin to rotate by means of the system of belts and pulleys already described. During this action the reversing belt 105 is slipping on the pulleys 102 and 107. As the drum 44 rotates, the endless belt 111 is driving the carriage 64 across the shaft 70 and above the master tabulator 56. Simultaneously, as the drum 45 rotates, the master tabulator 56 is being rotated beneath the carriage 64. These two simultaneous actions determine the position of the verifying point 128 over the location of the number space 1234 on master tabulator 56.

The rotation of drum 45 brings the initial stop 55 in contact with stop 42 on finger 41 but this action does not retard the movement of the drum 45 because the action of drum 45 against the finger 41 pulls the entire stop plate 32 rearwardly about the pivot plate 34 until the peg 29 strikes its respective stop in the groove of the stop plate 32 at which time both the movement of the drum 45 and stop plate 32 is checked. Then the drum continues to rotate until the final stop pin 43 on finger 41 abuts the secondary stop member 54 which is in the same opening on the drum and this action retards the movement of the drum 45 thereby stopping the carriage 64 at its proper location.

Simultaneously, a similar action of drum 44 has brought its stop plate 40 into engagement with the stop on key 28 and the drum 44 has rotated until the final stop 53 of drum 44 abutted the final stop pin 43 on finger 40. This action brings the master cylinder 56 to its proper arcuate location beneath the pointer 128 on the carriage 64 and the combined action of drums 44 and 45 has located the proper and permanent position of the number 1234 beneath the pointer 128, which position will always be reached when the number 1234 is entered on the keyboard.

To receive the indication of character group 1234, the handle 71 is turned to approximately one-half position thereby lowering the plunger 77 and bringing the pointer 128 to just in contact with the surface of the material 58. If there is no perforation at the location of number 1234 on sheet material 58, which there is not in the present example, the pointer 128 does not move past the surface contact position and the electrical contact 85 closes the circuit through the contact 81. The operator then presses the switch 93 which causes the white light 92 to show bright thereby indicating that there is no perforation and consequently the credit of that number is good.

During this entire operation, which takes only a few seconds, the push rod 117 is held in a down position and the motor 94 remains energized but the drums 44 and 45 are prohibited from any further movement in a forward direction after reaching their respective final stops. Therefore, releasing the push rod 117 actuates the clutch 100 to reverse the movement of the drums 44 and 45 bringing the machine back to initial or zero position, and upon reaching this initial position, the clutch fingers 123 and 124 drop into their respective notches on the peripheries of drums 44 and 45 thereby forcing switch control arm 125 to break the circuit between contacts 126 to 127 to cut off the energy to the motor 94. The machine is now in condition to verify another number.

When it becomes necessary to nullify the credit of any individual holding a particular number group, that number group is entered into the keyboard, the push rod 117 is depressed thereby moving the carriage 64 and the master cylinder 56 to the location of that particular number beneath the plunger verifying point 128. Then the handle 71 is moved to maximum position which forces the point 128 to dig and perforate that number location on the material 58. Any subsequent verifications of that particular number will result in the lighting up of the red light 91 due to the action of point 128 dropping into perforation in the contact cylinder 56, causing contact 85 to complete a circuit through the contact 82. If at any subsequent time it beomes necessary to reinstate the credit of a particular number group after its position has been perforated, the number is entered and the machine operated to reach that location on the sheet 58. Then a small piece of gummed tape, or "Scotch" tape, may be placed over the perforation thereby restoring the smooth surface in that location.

For a brief résumé, it is seen that the master tabulator 56 contains a plurality of separate and distinct positions on the material 58 and each position represents a particular character or number group as determined by the entry made on the keyboard. Each time that same location is reached beneath the carriage 64 and the point 128, due to the simultaneous action of the master cylinder 56 rotating and the carriage 64 traversing across the cylinder 56. When there is no perforation on material 58 at the location of the particular number, the white light will be energized; however, when there has been a previous perforation made by the pointer 128, the red light will be energized.

Although I have illustrated a particular construction of keyboard, comprising pegs 28, 28', and 29, 29', it is obvious that any keyboard known in the art may be utilized to position the carriage 44 and the master tabulator 56. Further it will be obvious to those skilled in the art that chains, gears or other positive drive means can be used to replace the belts shown merely for purpose of illustration, and that many other modifications and changes may be made in the embodiment shown and described without departing from the scope of my invention as defined in the appended claims.

I claim:

1. In a machine of the class described, the combination with a keyboard character means selectively operable to position stop means in the path of first and second driving means, of a tabulator having a penetrable surface and being driven by said first driving means, and a sensing device for sensing the surface of said tabulator and being driven by said second driving means relative to said tabulator, the movement of said tabulator being selectively controlled by said keyboard means independently of said sensing device.

2. In a machine of the class described, the combination with a keyboard character means selectively operable to position stop means in the path of rotatable first and second driving means, of a substantially cylindrical tabulator having a penetrable surface and being rotatably driven by said first driving means, and a sensing device for sensing the surface of said tabulator and being simultaneously driven by said second driving means longitudinally of said tabulator, the rotation of said tabulator being selectively controlled by said keyboard means independently of said sensing device.

3. In a machine of the class described, a cylindrical rotatable tabulator, a sensing device simultaneously movable longitudinally of said tabulator, first driving means for said tabulator and second driving means for said sensing device, and keyboard character means having a first series of stop means for selective stopping of said first driving means and a second series of stop means for selective stopping of said second driving means.

4. In a machine of the class described, a movable tabulator, sensing means associated with and movable relative to said tabulator, first stop means controlling the movement of said tabulator, and second stop means controlling the movement of said sensing means, said first and second stop means determining the particular point location on said tabulator examined by said sensing means.

5. In a machine of the class described, a frame, a tabulator rotatably mounted on said frame, a carriage mounted for movement across said tabulator, sensing means associated with said carriage for selectively examining the surface of said tabulator, said sensing means being selectively operable to affect the surface of said tabulator, keyboard character means on said frame, a first series of stop means operable by said keyboard character means for controlling said tabulator, a second series of stop means operable by said keyboard character means for controlling said carriage independently of said tabulator, said keyboard character combination determining the particular location on said tabulator examined by said sensing means, said sensing means being operable to determine whether the location of any particular character combination on said tabulator has been affected by said sensing means.

6. In a machine of the class described, a frame, a master tabulator rotatably mounted on said frame, a carriage mounted for movement across said master tabulator, a cylinder movably mounted in said carriage, sensing means within said cylinder for selectively examining the surface of said tabulator, said sensing means being selectively operable to affect the surface of said cylinder, first driving means for said master tabulator, second driving means for said carriage, keyboard character means on said frame, first means operable by said keyboard for controlling said first driving means, second means operable by said keyboard for controlling said second driving means independently of said first driving means, said keyboard being operable to determine the particular location on said tabulator examined by said sensing means, said sensing means being operable to determine whether the location of any particular character combination on said tabulator has been affected by said sensing means.

7. In a machine of the class described, a frame, a substantially cylindrical tabulator rotatably mounted on said frame, a carriage mounted for movement across said tabulator, a cylinder movably mounted in said carriage, sensing means within said cylinder for selectively examining the surface of said tabulator, said sensing means being selectively operable to affect the surface of said cylinder, indicator means operable by said sensing means, first and second drums rotatably mounted for independent movement on said frame, first driving means between said first drum and said tabulator, second driving means between said second drum and said carriage, power means on said frame for driving said first and second drums, keyboard character means on said frame, a first series of stop means operable by said keyboard for stopping said first drum, a second series of stop means operable by said keyboard for stopping said second drum independently of said first drum, said keyboard character combination determining the particular location on said tabulator examined by said sensing means, said sensing means determining whether the location of any particular character combination on said tabulator has been affected by said sensing means.

8. In a machine of the class described, a frame, a master tabulator rotatably mounted on said frame, a carriage mounted for movement across said master tabulator, sensing means associated with said carriage for selectively examining the surface of said master tabulator, said sensing means being selectively operable to affect the surface of said master tabulator, indicator means operable by said sensing means, first and second drums rotatably mounted for independent movement on said frame, first driving means between said first drum and said master tabulator, second driving means between said second drum and said carriage, motive power means for driving said first and second drums, keyboard character means on said frame, means operable by said keyboard for stopping said first drum, means operable by said keyboard for stopping said second drum independently of said first drum, said keyboard character combination determining the particular location on said tabulator examined by said sensing means, said sensing means being operable to determine whether the location of any particular character combination on said tabulator has been affected by said sensing means.

9. In a machine of the class described, a frame, a substantially cylindrical tabulator rotatably mounted on said frame, a carriage mounted for movement across and above said tabulator, a cylinder vertically movable in said carriage, sensing means within said cylinder for selectively examining the surface of said tabulator, said sensing means being selectively operable to affect the surface of said tabulator, indicator means operable by said sensing means, first and second drums rotatably mounted for independent movement on said frame, first driving means between said first drum and said tabulator, second driving means between said second drum and said carriage, motive power means for driving said first and second drums, keyboard character means on said frame, a first series of stop means operable by said keyboard for stopping said first drum, a second series of stop means operable by said keyboard for stopping said second drum independently of said first drum, said keyboard character combination determining the particular location on said tabulator examined by said sensing means, said sensing means being operable to determine whether the location of any particular character combination on said tabulator has been affected by said sensing means.

10. In a machine of the class described, a frame, a tabulator movably mounted on said frame, a carriage mounted for movement across said tabulator, a cylinder movably mounted in said carriage, sensing means within said cylinder for selectively examining the surface of said tabulator, said sensing means being selectively operable to affect the surface of said cylinder, indicator means operable by said sensing means, keyboard character means on said frame, first means operable by said keyboard for controlling said tabulator, second means operable by said keyboard for controlling said carriage, said keyboard character combination determining the particular location on said tabulator to be examined by said sensing means, said sensing means determining whether the location of any particular character combination on said tabulator has been affected by said sensing means.

11. In a machine of the class described, a frame, a tabulator rotatably mounted on said frame, a carriage mounted for movement across said tabulator, sensing means on said carriage for selectively examining the surface of said tabulator, said sensing means being selectively operable to affect the surface of said tabulator, first and second drums rotatably mounted for independent movement on said frame, first driving means between said first drum and said tabulator, second driving means between said second drum and said carriage, means for driving said first and second drums, keyboard character means on said frame, a first series of stop means operable by said keyboard for stopping said first drum, a second series of stop means operable by said keyboard for stopping said second drum independently of said first drum, said keyboard character combination determining the particular location on said tabulator to be examined by said sensing means, said sensing means determining whether the location of any particular character combination on said tabulator has been affected by said sensing means.

References Cited in the file of this patent

UNITED STATES PATENTS

| | | |
|---|---|---|
| 1,694,631 | Trojani et al. | Dec. 11, 1928 |
| 1,977,889 | Oehlsen | Oct. 23, 1934 |
| 2,059,248 | Konig | Nov. 3, 1936 |
| 2,080,100 | Tauchek | May 11, 1937 |
| 2,202,517 | De Koevend | May 28, 1940 |
| 2,224,244 | Hicks | Dec. 10, 1940 |
| 2,281,373 | Naes | Apr. 28, 1942 |
| 2,282,072 | Maul | May 5, 1942 |
| 2,337,082 | Broido | Dec. 21, 1943 |
| 2,375,275 | Brand | May 8, 1945 |
| 2,521,284 | Clough | Sept. 5, 1950 |
| 2,540,654 | Cohen et al. | Feb. 6, 1951 |
| 2,564,403 | May | Aug. 14, 1951 |
| 2,587,532 | Schmidt | Feb. 26, 1952 |
| 2,610,791 | Avakian | Sept. 16, 1952 |
| 2,620,389 | Potter | Dec. 2, 1952 |

FOREIGN PATENTS

| | | |
|---|---|---|
| 244,013 | Germany | June 3, 1909 |